United States Patent
Nagao et al.

(10) Patent No.: US 10,576,815 B2
(45) Date of Patent: Mar. 3, 2020

(54) ROTARY ELECTRIC MACHINE HOUSING AND ROTARY ELECTRIC MACHINE EQUIPPED THEREWITH

(71) Applicant: Hitachi Automotive Systems, Ltd., Hitachinaka-shi, Ibaraki (JP)

(72) Inventors: Riichi Nagao, Tokyo (JP); Shinji Yamazaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 191 days.

(21) Appl. No.: 15/500,645

(22) PCT Filed: Aug. 19, 2015

(86) PCT No.: PCT/JP2015/073171
§ 371 (c)(1),
(2) Date: Jan. 31, 2017

(87) PCT Pub. No.: WO2016/035546
PCT Pub. Date: Mar. 10, 2016

(65) Prior Publication Data
US 2017/0217301 A1 Aug. 3, 2017

(30) Foreign Application Priority Data
Sep. 5, 2014 (JP) .................................. 2014-180736

(51) Int. Cl.
*H02K 5/04* (2006.01)
*B60K 6/405* (2007.10)
(Continued)

(52) U.S. Cl.
CPC ................ *B60K 6/405* (2013.01); *B60K 6/26* (2013.01); *H02K 1/185* (2013.01); *H02K 5/04* (2013.01);
(Continued)

(58) Field of Classification Search
CPC .. H02K 5/04; H02K 5/20; H02K 5/26; H02K 1/185; H02K 15/028; H02K 15/14
(Continued)

(56) References Cited

U.S. PATENT DOCUMENTS

2011/0080064 A1  4/2011 Kudose et al.

FOREIGN PATENT DOCUMENTS

| JP | 2009-60760 A | 3/2009 |
| JP | 2009-148115 A | 7/2009 |

(Continued)

OTHER PUBLICATIONS

Machine translation of JP-2013042661-A. (Year: 2013).*
(Continued)

*Primary Examiner* — Michael Andrews
(74) *Attorney, Agent, or Firm* — Crowell & Moring LLP

(57) ABSTRACT

Provided is a rotary electric machine housing and a rotary electric machine equipped with the same. The housing allows the reduction of press fitting force required in each of two press fitting steps and has a high cooling effect. This rotary electric machine housing includes an internal cylinder 10 allowing press fitting of a stator 20 along an inner diameter end of the internal cylinder. The internal cylinder 10 has an internal cylinder-side tapered face on its outer diameter end surface. The housing further includes an external cylinder 11 having an external cylinder-side tapered face on an inner diameter end of the external cylinder. The external cylinder-side tapered face fits onto the internal cylinder-side tapered face. It is preferred that an inner diameter of the internal cylinder be smaller than an outer diameter of the stator; an outer diameter of the internal cylinder be larger than an inner diameter of the external cylinder; and a difference between the outer diameter of the internal cylinder and the inner diameter of the external (Continued)

cylinder be larger than a difference between the inner diameter of the internal cylinder and the outer diameter of the stator.

5 Claims, 12 Drawing Sheets

(51) Int. Cl.
    *H02K 5/20*     (2006.01)
    *H02K 1/18*     (2006.01)
    *B60K 6/26*     (2007.10)
    *B60L 50/16*     (2019.01)
    *B60W 10/08*     (2006.01)

(52) U.S. Cl.
    CPC ............... *H02K 5/20* (2013.01); *B60L 50/16* (2019.02); *B60W 10/08* (2013.01)

(58) Field of Classification Search
    USPC .............................................. 310/89, 91, 85
    See application file for complete search history.

(56) References Cited

FOREIGN PATENT DOCUMENTS

| JP | 2009148115 | A | * | 7/2009 |
| JP | 2010-259315 | A | | 11/2010 |
| JP | 2012-100521 | A | | 5/2012 |
| JP | 2013-42661 | A | | 2/2013 |
| JP | 2013042661 | A | * | 2/2013 |

OTHER PUBLICATIONS

Machine translation of JP-2009148115-A. (Year: 2009).*
International Search Report (PCT/ISA/210) issued in PCT Application No. PCT/JP2015/073171 dated Nov. 10, 2015 with English translation (three pages).
Japanese-language Written Opinion (PCT/ISA/237) issued in PCT Application No. PCT/JP2015/073171 dated Nov. 10, 2015 (four pages).

* cited by examiner

ROTARY ELECTRIC MACHINE HOUSING AND ROTARY ELECTRIC MACHINE EQUIPPED THEREWITH

TECHNICAL FIELD

The present invention relates to a rotary electric machine housing and a rotary electric machine equipped with the same.

BACKGROUND ART

Rotary electric machines are used, for example, in auxiliary motors for internal combustion engines for driving hybrid electric vehicles (HEVs) and in main motors for driving electric vehicles (EVs).

Housings for these rotary electric machines are required to prevent the stator from being slipped by torque reaction or inertial force owing to vibrations acting on the stator and to dissipate or transfer heat generated at the stator conductor to outside the machine or the coolant.

It is known that a conventional rotary electric machine housing has a structure made up of a substantially cylindrical center housing, as well as a front housing and a rear housing for closing the openings of the center housing. A known rotary electric machine having this housing structure includes a center housing, and front and rear housings. The center housing internally has a stator that is fastened by shrink or press fitting. The stator includes a stator core made from a laminated electromagnetic steel sheet, a stator coil wound around at least one slot on the stator core, and a rotor that is held rotatably and provided with a predetermined gap to the inner face of the stator. The rotor includes a rotor core made from a laminated electromagnetic steel sheet, a stator conductor fastened by shrink or press fitting or bonding to at least one slot on the rotor core, and a rotor shaft fastened by shrink or press fitting inside the inner face of the rotor. The rotor shaft is rotatably held via bearings provided on the front and rear housings, respectively. A protrusion of the shaft held at the front housing transmits motive power. Fastening the entire outer perimeter of the stator to the inner perimeter of the center housing through contact between them enables tight fastening for preventing the stator from being slipped by torque reaction or inertial force owing to vibrations acting on the stator. Placing the entire outer perimeter of the stator into contact with the inner perimeter of the center housing maximizes the contact area through which heat generated at the stator conductor is transferred to the center housing.

In recent years, there has been high demand for technologies with which to increase the output of rotary electric machines especially for use in EVs. Rotary electric machines with higher output are effectively achieved by increasing the thickness of the laminated stator or the amount of electric current. However, increasing the thickness of the laminated stator will make the rotary electric machine structure larger. Generally, a center housing and a stator have been fastened to each other by shrink or press fitting. A larger motor structure resulting from a thicker laminated stator increases shrink fitting time. This disadvantage has generated concerns about reduced production efficiency and upsized shrink fitting equipment. A thicker laminated stator also causes an increase in press fitting distance. This increases required press fitting force and necessitates upsizing of press fitting equipment. An increase in electric current flowing in a rotary electric machine increases the amount of heat generated at the stator conductor. Thus, forced cooling by a coolant or oil is necessary for cooling the rotary electric machine.

To resolve these problems, a structure for press fitting of a stator into a two-way split center housing is proposed, as disclosed in PTL 1. The center housing is split in two in the lamination thickness direction. The split center housing segments are partially tapered for matching. A rotary electric machine as is disclosed in PTL 2 has a structure that includes a coolant duct inside a center housing so as to cool the rotary electric machine by the forced circulation of a coolant in response to an increase in the amount of heat generated at the stator conductor. Another structure for coolant-use forced cooling is proposed, as disclosed in PTL 3. This structure includes a concave coolant duct provided on the outer perimeter of a center housing and a cylindrical cover provided as an outer casing on the outer perimeter of the center housing.

CITATION LIST

Patent Literature

PTL 1: Japanese Unexamined Patent Application Publication No. 2009-148115
PTL 2: Japanese Unexamined Patent Application Publication No. 2012-100521
PTL 3: Japanese Unexamined Patent Application Publication No. 2013-42661

SUMMARY OF INVENTION

Technical Problem

A two-way split center housing as disclosed in PTL 1 may include tapered matching sites that do not produce satisfactory fastening because of machining tolerances on the taper angle. In that case, the structure cannot secure the stator without letting the stator be slipped by torque reaction or inertial force owing to vibrations. If taper interference is increased with respect to machining tolerances to produce necessary fastening force, the circumferential stress put on the outer perimeter of the housing increases. This may necessitate the thickness of the housing to be increased in the diameter direction to ensure housing strength, leading to upsizing of the rotary electric machine.

In a structure as in PTL 2, a coolant duct is formed inside a center housing. Thus, the center housing needs to be produced by die casting or any other casting in which the duct is molded by a core made from sand or resin. This causes concern about a rise in the cost of center housing production.

Unlike PTL 2, the housing as disclosed in PTL 3 is suitable for production because the duct is formed on the outer perimeter of the center housing. Unfortunately, the stator is secured against external force only by fastening force between the center housing and the stator because the outer casing for covering the duct is disposed on the outer perimeter of the center housing and functions only for airtight sealing of the coolant. As a result, this structure faces a disadvantage involved in the fastening work described above if the center housing and the stator with increased lamination thickness are fastened each other.

It is an object of the present invention to provide a rotary electric machine housing, as well as a rotary electric machine equipped with the same, in which the housing allows the reduction of press fitting force required in each of two press fitting steps and has a high cooling effect.

Solution to Problem

An aspect of the present invention includes structural elements, for example, specified in any of claims to resolve the problems described above.

The present invention includes a plurality of solutions to the problems described above. A rotary electric machine housing according to a first aspect of the present invention includes an internal cylinder allowing press fitting of a stator along an inner diameter end of the internal cylinder. The internal cylinder has an internal cylinder-side tapered face on its outer diameter end surface. The housing further includes an external cylinder having an external cylinder-side tapered face on an inner diameter end of the external cylinder. The external cylinder-side tapered face fits onto the internal cylinder-side tapered face.

Advantageous Effects of Invention

The first aspect of the present invention can provide a rotary electric machine housing, as well as a rotary electric machine equipped with the same, in which the housing allows the reduction of press fitting force required in each of two press fitting steps and has a high cooling effect.

Problems, configurations and effects other than those described above will be made clear by description of embodiments below.

DESCRIPTION OF EMBODIMENTS

Figure 1:
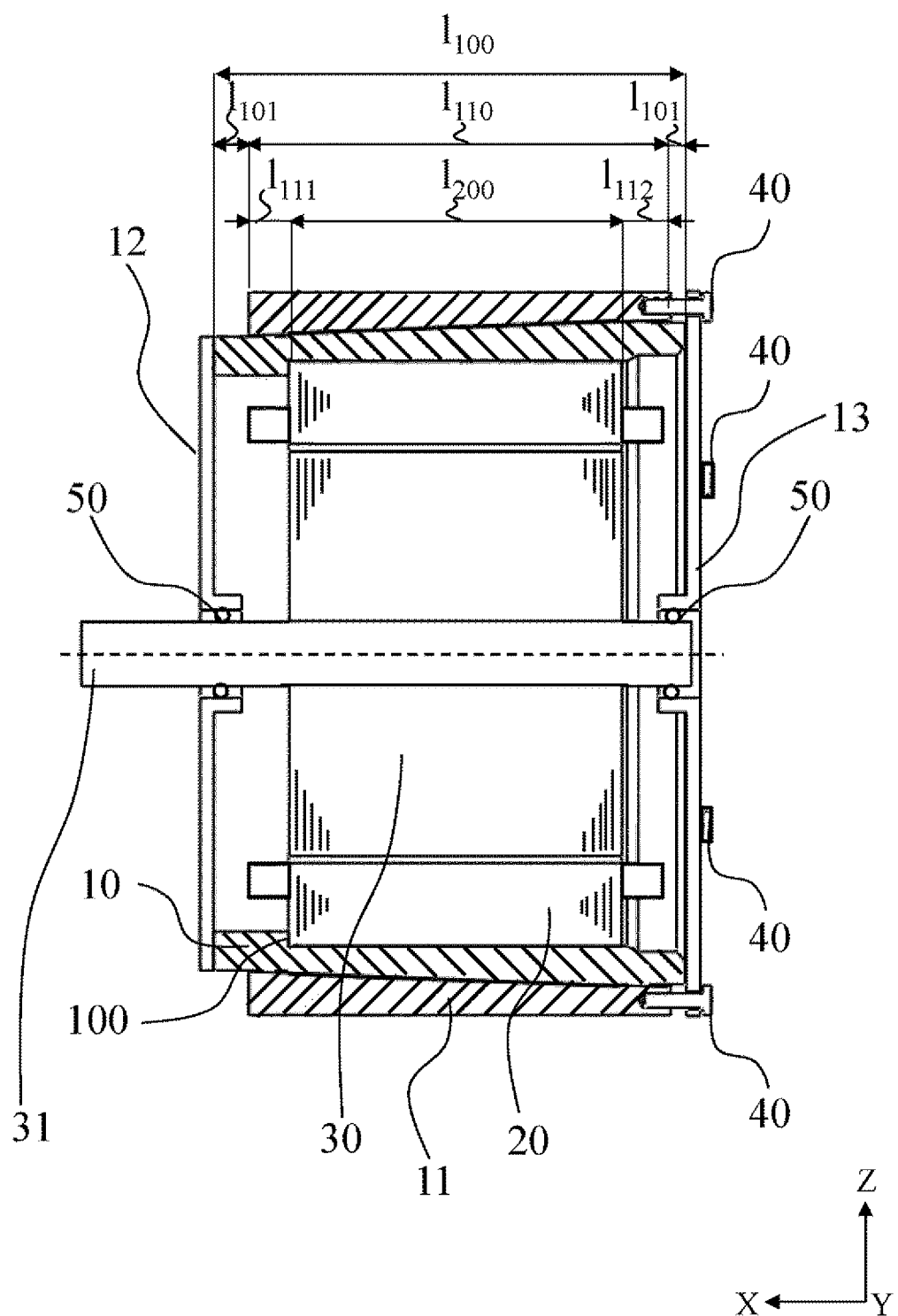
FIG. 1 is an axial sectional view of a first embodiment.
Figure 2:
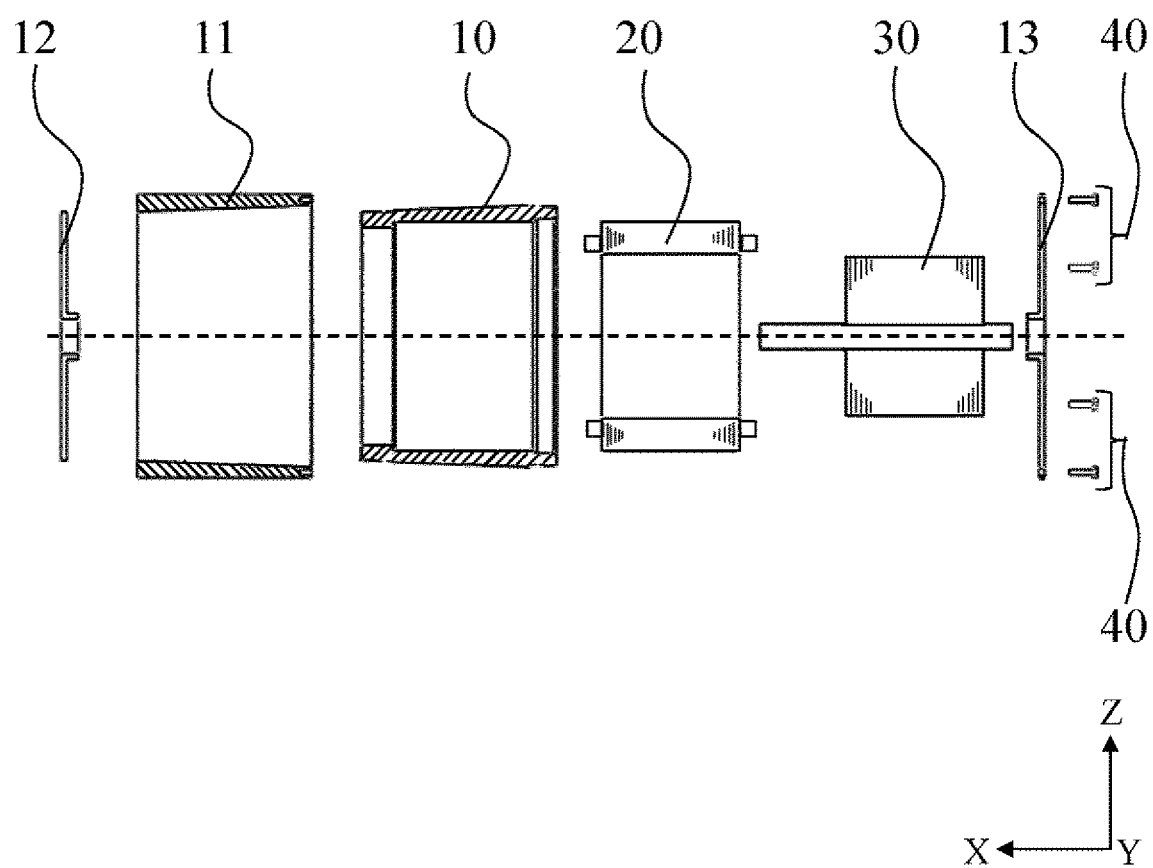
FIG. 2 is an axial sectional view of key components before being assembled into a rotary electric machine of the first embodiment.

Embodiments of the present invention will now be described with reference to the attached drawings. In the embodiments described below, an electric motor for driving an HEV is taken as an example of a rotary electric machine. However, the present invention can be applied to any rotary electric machine other than those for driving HEVs. Examples of the applicable rotary electric machine include EV-use rotary electric machines for purposes other than driving, rotary electric machines for other vehicles, and rotary electric machines for transport machinery, industrial machinery, infrastructure equipment, medical equipment, household electric appliances, and inspection or analytical instruments.

In the embodiments described below, the "axial direction" refers to a direction along the rotation axis of a rotary electric machine (x-axis direction in the drawings). The circumferential direction refers to a direction along the rotational orientation of the rotary electric machine. The "diameter direction" refers to a radial direction (a radius direction) along which radius vectors go out from the rotation axis of the rotary electric machine. The "inner perimeter side" refers to an inside in the diameter direction (an inner diameter end), whereas the "outer perimeter side" refers to a direction opposite to the inside, i.e. an outside in the diameter direction (an outer diameter end).

Example 1

With reference to FIGS. 1 to 7, a first embodiment will now be described.

A rotary electric machine according to the first embodiment includes an internal housing cylinder 10, an external housing cylinder 11 fastened to the outer perimeter of the internal housing cylinder 10 concentrically by press fitting, and a front housing 12 and a rear housing 13 for closing the openings of the internal housing cylinder 10. The front and rear housings 12 and 13 are fastened to the internal housing cylinder 10 by shrink or press fitting, bolts, bonding, welding, caulking, rivets or any other method.

The front housing 12 may be integrated with the internal housing cylinder 10 by die casting or any other casting.

The housing cylinder 11 has a stator 20 along its inner diameter end. The position of the stator 20 is determined in the axial direction by putting the stator 20 into contact with a stopper 100 provided on the internal housing cylinder 10. The stator 20 has a rotor 30 along its inner diameter end. The rotor 30 is provided with a predetermined gap to the stator 20 and is held rotatably. The rotor 31 includes a rotor shaft 31 fastened by shrink or press fitting. The rotor shaft 31 is rotatably held via bearings 50 that are fastened to the front and rear housings 12 and 13, respectively. The stator 20 includes a stator core formed from a laminated electromagnetic steel sheet and a stator coil wound around at least one slot on the stator core.

The outer diameter end of the internal housing cylinder 11 and the inner diameter end of the external housing cylinder 12 are tapered to match each other within a lamination thickness $l_{200}$ range of the stator 20. The internal housing cylinder 10 has a tapered site only within the lamination thickness $l_{200}$ range of the stator 20, whereas the external housing cylinder 11 has a tapered site extending throughout its inner diameter face. The tapered sites are provided such that the internal housing cylinder increases in diameter toward the rear housing 13 from the front housing 12.

The tapered sites may be provided such that the cylinder increases in diameter toward the front housing from the rear housing. Preferably, the outer diameter end of the internal housing cylinder 10 should have no tapered site outside the lamination thickness $l_{200}$ range of the stator 20, and the outer diameter end outside the range should make no contact with the inner diameter end of the external housing cylinder 11 when the internal housing cylinder is fastened to the external housing cylinder 11.

Alternatively, the internal housing cylinder 10 may have a tapered site extending throughout its outer diameter circumference and make contact with the tapered site of the external housing cylinder 11. The inner diameter end of the external housing cylinder 11 may have a tapered site with a length of only at least the lamination thickness $l_{200}$ of the stator 20.

Fastening force between the stator 20 and the internal housing cylinder 10 is produced since the internal housing cylinder 10 has an interference in its inner diameter such that an outer diameter $d_{201}$ of the stator 20 is smaller than an inner diameter $d_{100}$ of the internal housing cylinder 10 before assembly of the two parts. Thus, a predetermined contact pressure is generated on the fastening face. Fastening force between the internal and external housing cylinders 10 and 11 is produced since the internal housing cylinder 10 has an interference in its outer diameter such that an outer diameter of the internal housing cylinder 10 at a position for taper matching is larger than an inner diameter of the external housing cylinder 11 at the same position before assembly or after press fitting of the stator 20 into the internal housing cylinder 10. Thus, a predetermined contact surface pressure is generated on the fastening face. At this time, the interference provided for the outer diameter of the internal housing cylinder 10 is greater than or equal to the interference provided for the inner diameter of the internal housing cylinder 10. Because of taper structure, press fitting force required for fastening the internal housing cylinder 10 to the external housing cylinder 11 is less than press fitting force required for fastening the stator 20 to the internal housing cylinder 10. Consequently, fastening force required for securing the stator 20 against external force is partially achieved by press fitting between the stator 20 and the internal housing cylinder 10, and the rest of the required force is achieved by press fitting between the tapered internal and external housing cylinders.

Press fitting force is proportional to contact surface pressure. Thus, this embodiment reduces contact pressure created in one step and involves multiple press fitting steps. As a result, this embodiment or any similar configuration allows the reduction of press fitting force required in each step, thereby preventing press fitting force from being increased by a rise in lamination thickness. Since the stator 20 includes a wound stator conductor, it is preferable that the internal housing cylinder 10 be fixed with a jig or any other fixture in the axial direction and the stator 20 be press fitted into the internal housing cylinder 10 in a press-in direction $20p$ until the stator 20 comes into contact with the stopper 100.

Figure 6:
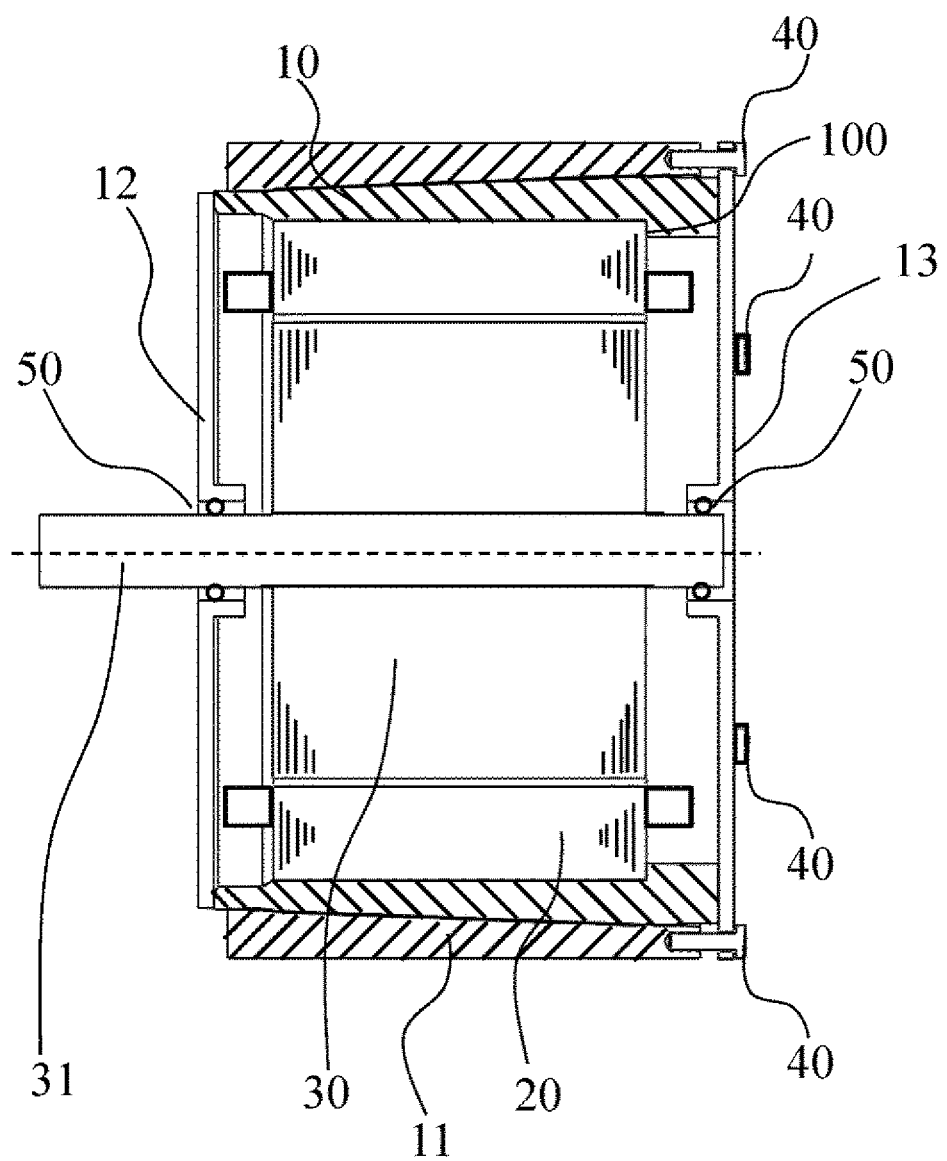
FIG. 6 is an axial sectional view illustrating an example of a changed stopper position for the stator of the first embodiment.
Figure 7:
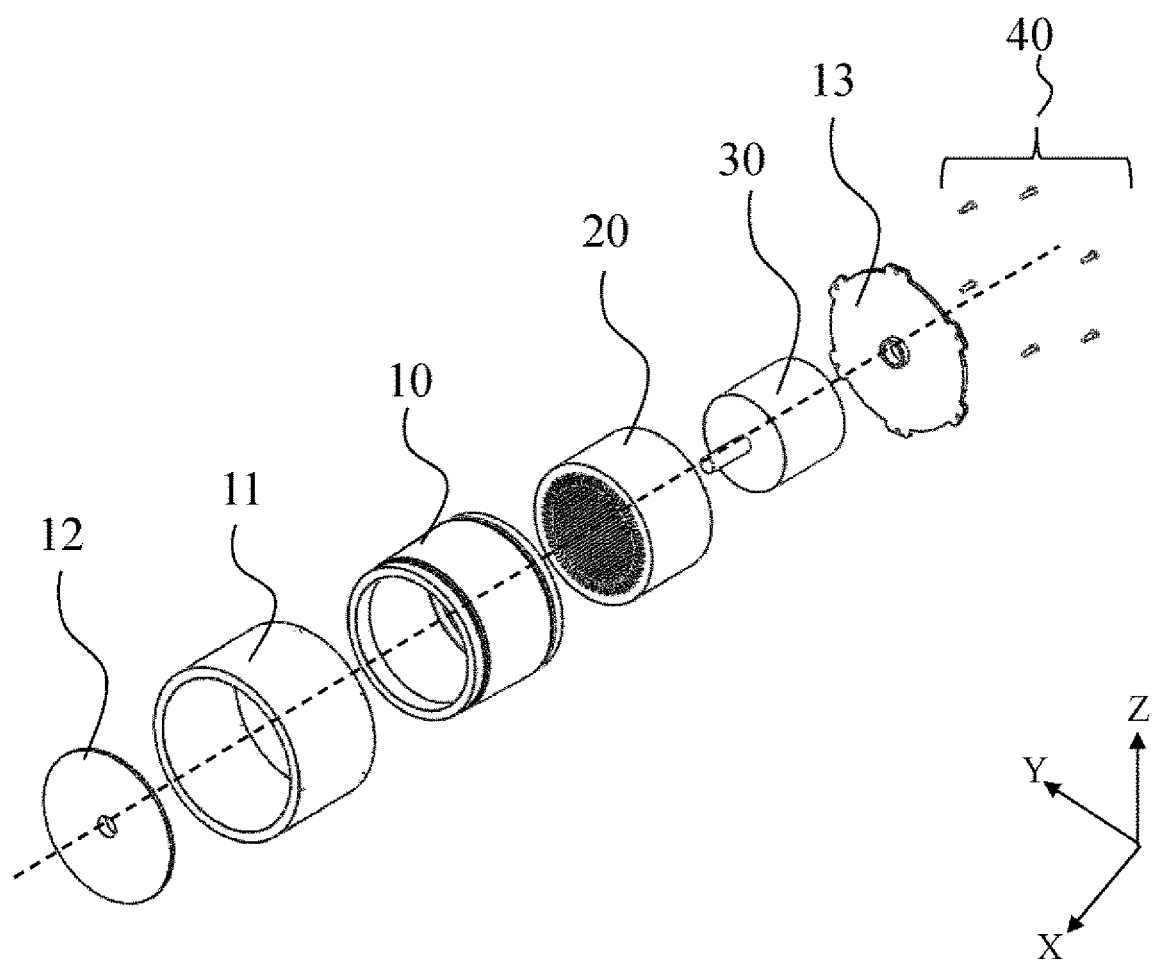
FIG. 7 is a perspective view of key components before being assembled into the rotary electric machine of the first embodiment.
Figure 8:
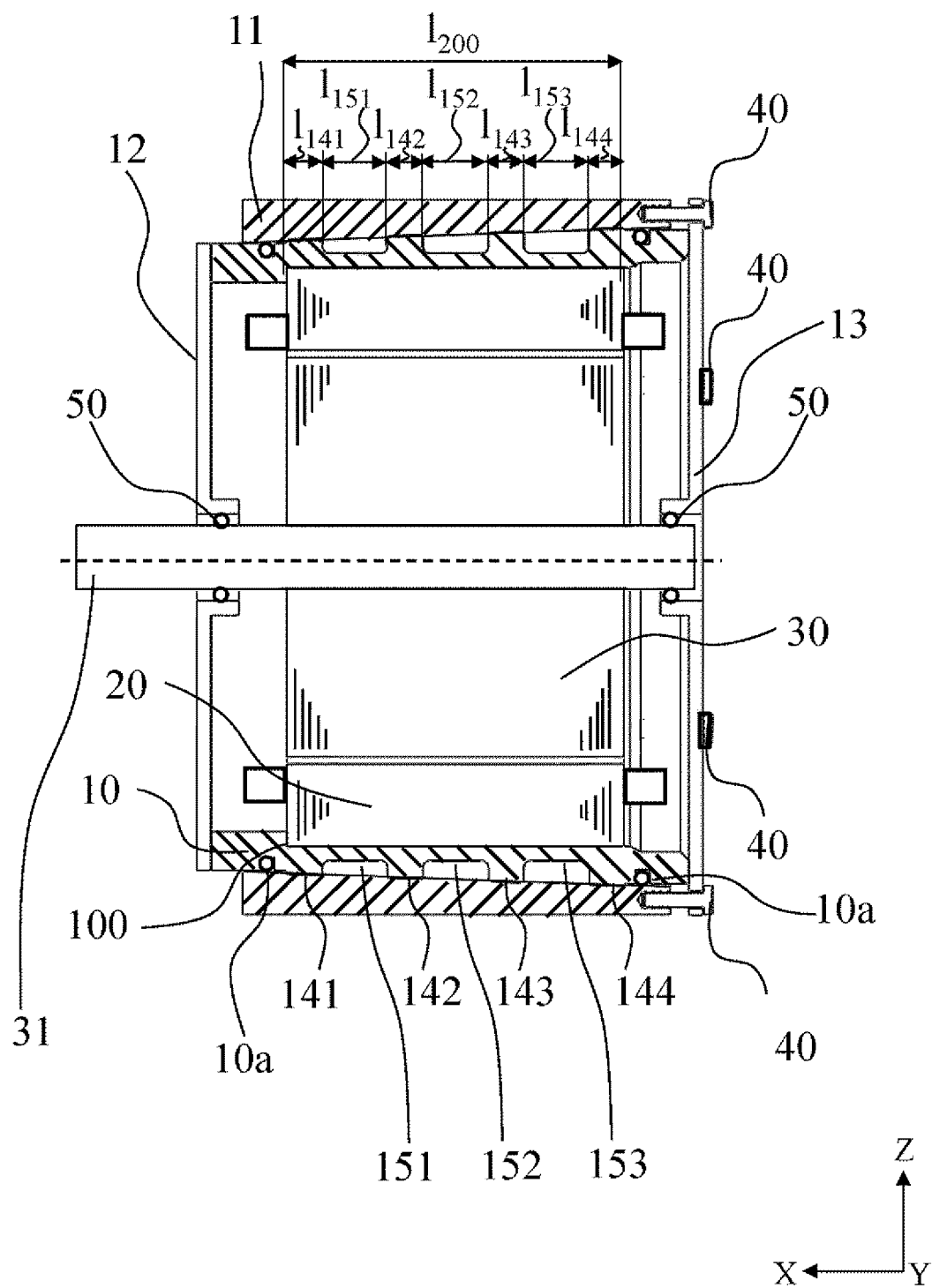
FIG. 8 is an axial sectional view of a second embodiment.
Figure 9:
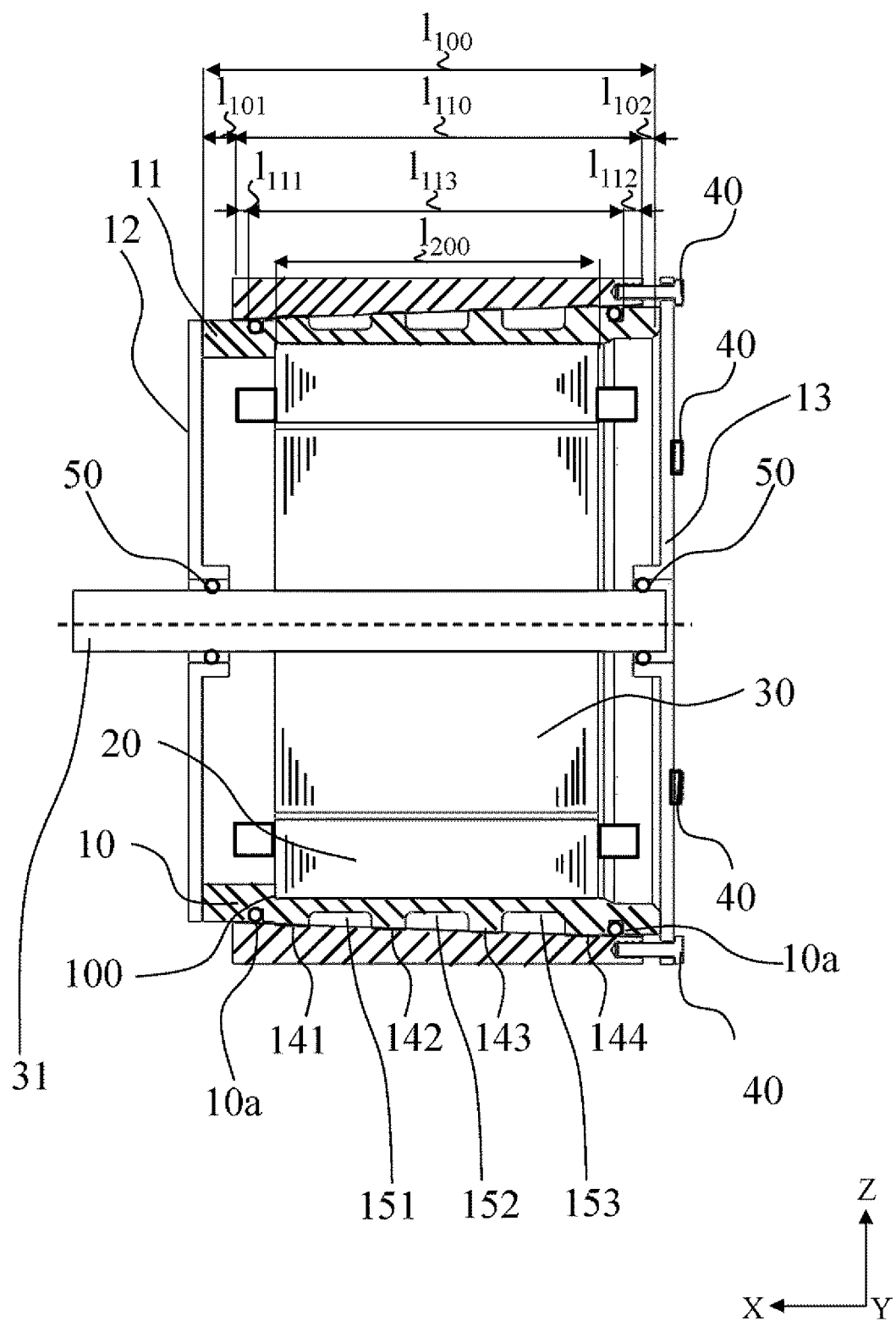
FIG. 9 is an axial sectional view illustrating dimensions of an internal housing cylinder and an external housing cylinder according to the second embodiment.
Figure 10:
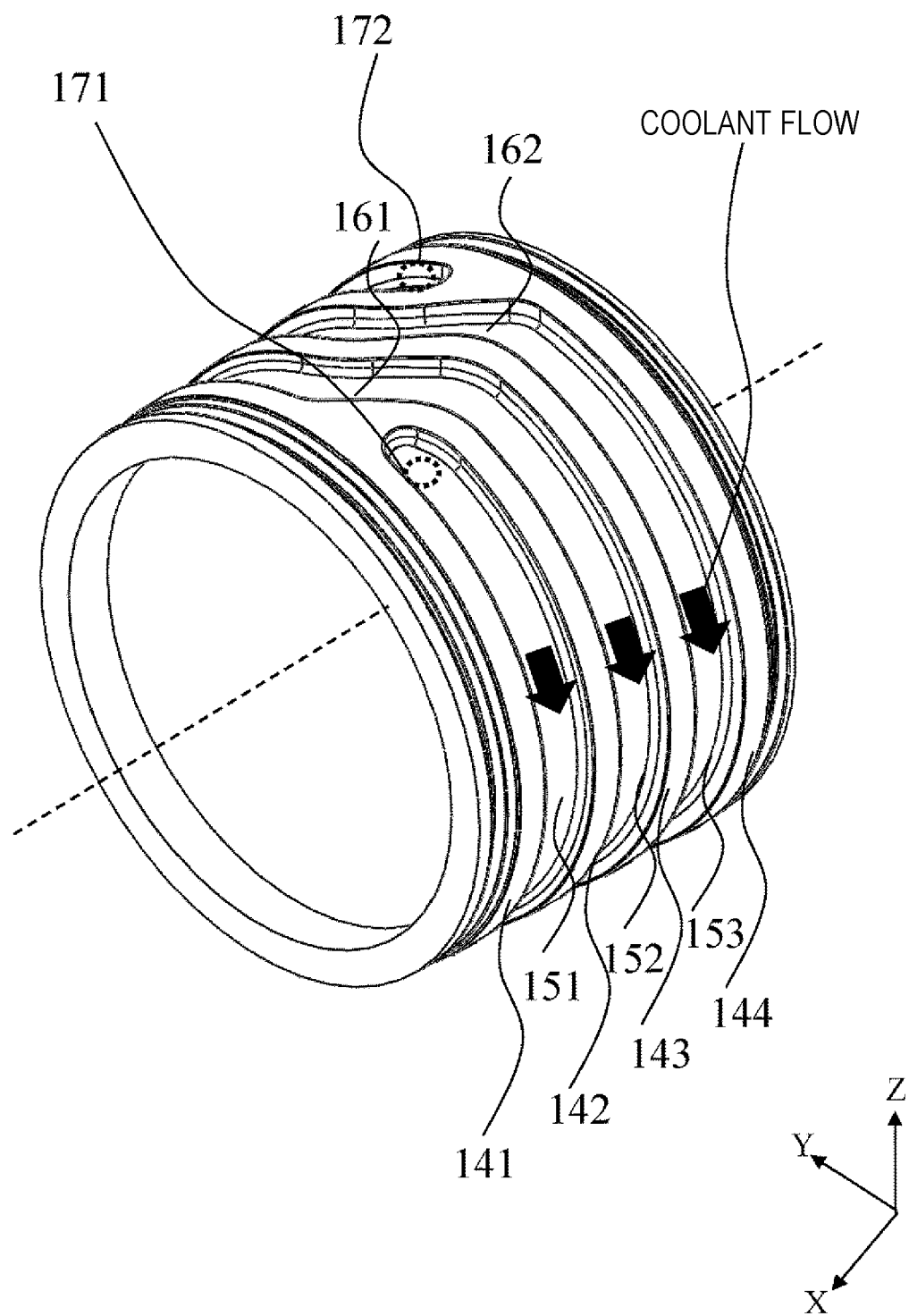
FIG. 10 is a perspective view illustrating an example duct on the internal housing cylinder of the second embodiment.
Figure 11:
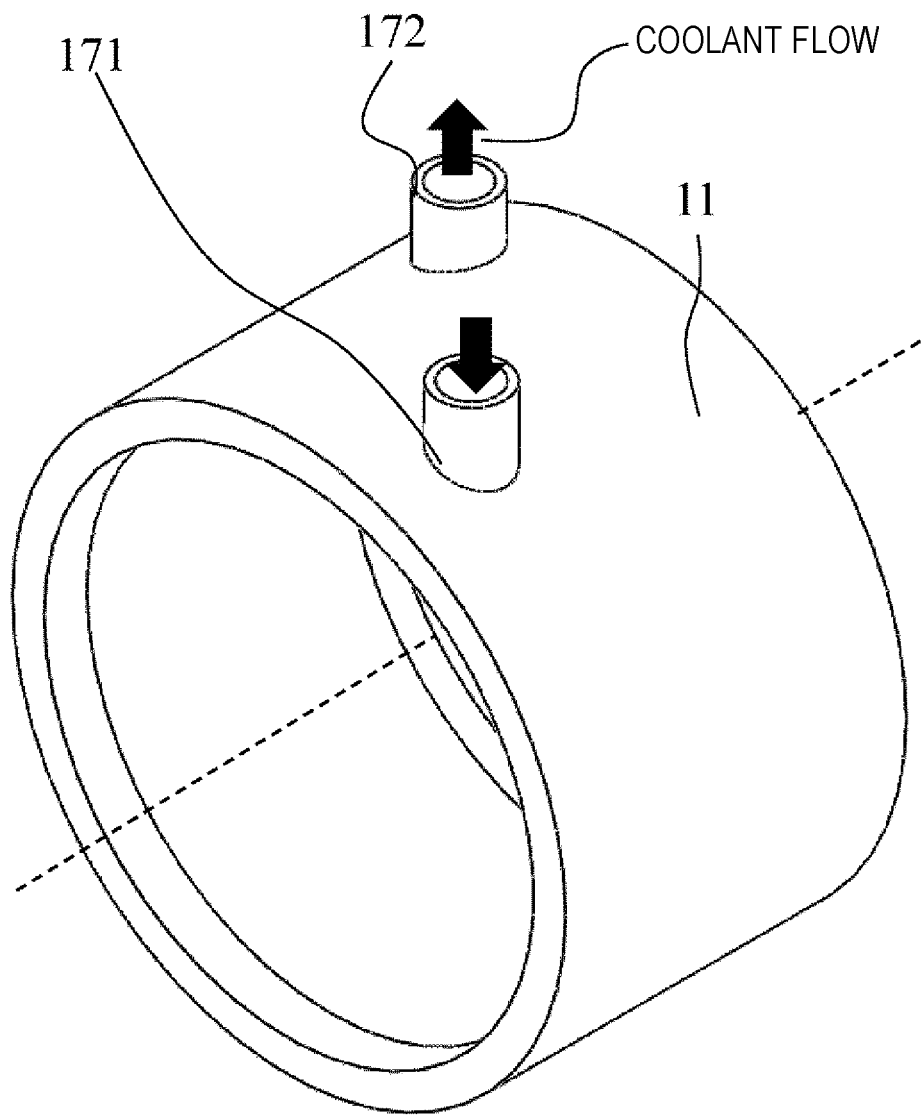
FIG. 11 is a perspective view illustrating an example of an inlet and an outlet on the external housing cylinder of the second embodiment.

The stopper 100 provided on the internal housing cylinder 10 may be replaced with a jig or any other fixture. The stator may be press fitted to a predetermined displacement. With reference to FIG. 6, the stopper 100 may be provided on the rear housing 13 side. The scope of this embodiment does not exclude a configuration in which the stator 20 is fixed with a jig or any other fixture in the axial direction and the internal housing cylinder 10 is press fitted in a press-in direction $10p$.

In consideration of the mass of the internal housing cylinder 10 holding the stator 20, it is preferable that the internal housing cylinder 20 be fixed in the axial direction and the tapered external housing cylinder 11 be press fitted in a press-in direction $11pp$ over the internal housing cylinder 10 having the press fitted stator 20. Preferably, the tapered external housing cylinder should be press fitted until a predetermined press fitting force is generated in the axial direction while the entire external housing cylinder 11 is axially located within a range of the outer perimeter of the internal housing cylinder 10. The external housing cylinder may be press fitted to a predetermined displacement.

The scope of this embodiment does not exclude a configuration in which the external housing cylinder 11 is fixed with a jig or any other fixture in the axial direction and the internal housing cylinder 10 holding the stator 20 is press fitted in a press-in direction $10pp$.

It is preferred that an axial length $l_{110}$ of the external housing cylinder 11 be greater than or equal to the total length of the lamination thickness $l_{200}$ of the stator 20, and a maximum value $l_{111}$ and a minimum value $l_{112}$ of machining tolerances for production of internal and external housing cylinders 10 and 11. Preferably, an axial length $l_{100}$ of the internal housing cylinder 10 should be greater than or equal to the total length of the axial length $l_{110}$ of the external housing cylinder and a length $l_{101}$ added to each of both ends of the axial length of the external housing cylinder, wherein the length $l_{101}$ is the sum of the maximum value $l_{111}$ and the $l_{112}$ of machining tolerances. An error may occur in matching between the internal and external housing cylinders 10 and 11 due to taper angle tolerances, leading to unevenness in contact pressure created between the internal and external housing cylinders 10 and 11. As a result, a required contact pressure value may not be created. Even in the case of occurrence of such an error, if the axial lengths $l_{100}$ and $l_{110}$ of the internal and external housing cylinders 10 and 11 are set to values as described above, the tapered cylinders can be press fitted to a predetermined press fitting force and the matching problem owing to machining tolerances can be alleviated. This configuration enables the steady positioning of the external housing cylinder 11 at the outer perimeter of the stator 20, the creation of at least a predetermined contact surface pressure between the internal and external housing cylinders 10 and 11, and the creation of contact pressure needed for securing the stator 20 on the entire contact face between the stator 20 and the internal housing cylinder 10.

The external housing cylinder 11 that has been press fitted into a position for enabling creation of a predetermined contact pressure is fastened to the rim of the rear housing 13 via its end on the rear housing 13 side using at least one bolt 40 in the axial direction, with a clearance of 0 mm or greater left for $l_{101}$. Fastening between the internal and external housing cylinders 10 and 11 may be achieved by tightening the external housing cylinder 11 through application of predetermined torque to the bolt 40 instead of press fitting. At least one flange, rib or any other projection may be provided on the outer diameter region of the external housing cylinder 11.

Preferably, the internal and external housing cylinders 10 and 11 should be made from aluminum or any similar material by cutting, casting or forging in consideration of weight reduction and heat transmission performance. Examples of other material used for constituting the internal and external housing cylinders 10 and 11 include steel, stainless steel, copper, carbon fiber plastics, and glass fiber plastics.

Example 2

With reference to FIGS. 8 to 11, a second embodiment will now be described. As for structural elements identical to those of the first embodiment, redundant description thereof is omitted.

In this embodiment, an internal housing cylinder 10 includes circumferential coolant ducts 151, 152, and 153 being incurved on part of its tapered outer face toward the inner diameter end, and duct walls 141, 142, 143, and 144 on its outer diameter face. A tapered external housing cylinder 11 is fastened to the duct walls 141, 142, 143, and 144 so as to partially create contact surface pressure, i.e. position fixing force, between a stator 20 and the internal housing cylinder 10.

The circumferential ducts 151, 152, and 153 are formed like three swathes along the outer perimeter of the stator 20. The circumferential ducts 151 and 152 are connected to each other via a joint duct 161 in the axial direction, while the circumferential ducts 152 and 153 are connected to each other via a joint duct 162 in the axial direction. A coolant runs into the circumferential ducts from an inlet 171 located at an end of the circumferential duct 151, flows along the circumferential ducts and the joint ducts, and discharges into the outside from an outlet 172 located at an end of the circumferential duct 153. Preferably, respective axial widths $l_{131}$, $l_{132}$, and $l_{133}$ of the circumferential ducts 151, 152, and 153 are equal in consideration of processability and manufacturability.

As the duct walls 141, 142, 143, and 144 are fastened to the tapered external housing cylinder 11 and create contact surface pressure, i.e. position fixing force, between the stator 20 and the internal housing cylinder 10, it is preferable that axial widths $l_{141}$, $l_{142}$, $l_{143}$, and $l_{144}$ of the respective duct walls be equal so as to prevent local unevenness in fastening force between the stator 20 and the internal housing cylinder 10.

The scope of the term "equal" does not exclude tolerances or variation in design and manufacturing.

Airtight sealing of the coolant is achieved with O-rings 10a disposed on grooves in the outer perimeter of the internal housing cylinder 10. Alternatively, the O-rings 10a may be replaced with gaskets or other sealants that are put onto both ends of the internal and external housing cylinders 10 and 11 to achieve airtight sealing. If no airtight sealing is needed for the coolant, the O-rings 10a, gaskets and other sealants can be omitted.

It is preferred that an axial length $l_{110}$ of the external housing cylinder 11 be greater than or equal to the total length of a distance $l_{113}$ between a front housing 12 side end and a rear housing 13 side end of the O-rings 10a, and a maximum value $l_{111}$ and a minimum value $l_{112}$ of machining tolerances for production of internal and external housing cylinders 10 and 11. Preferably, an axial length $l_{100}$ of the internal housing cylinder 10 should be greater than or equal to the total length of the axial length $l_{110}$ of the external housing cylinder and a length $l_{101}$ added to each of both ends of the axial length of the external housing cylinder, wherein the length $l_{101}$ is the sum of the maximum value $l_{111}$ and the $l_{112}$ of machining tolerances. This configuration, even if an error in matching between the internal and external housing cylinders 10 and 11 due to taper angle tolerances causes the position of the external housing cylinder 11 to deviate in the axial direction, enables the creation of a predetermined contact surface pressure on the duct walls 141, 142, 143, and 144 and the positioning of the housing 11 axially over the two O-rings 10a.

Press fitting of the tapered internal housing cylinder 10 into the tapered external housing cylinder 11 enables the creation of a predetermined contact surface pressure on the circumferential ducts 151, 152, and 153. If the circumferential stress put on the external housing cylinder is smaller than or equal to a 0.2% proof stress or a yield point of a material that makes up the cylinder, the three-step spiral structure may be replaced with a structure of three steps or fewer or four steps or greater. Moreover, the circumferential ducts 151, 152, and 153 may not be independently provided and connected axially via the joint ducts 161 and 162. In this case, the configuration includes a C-shaped circumferential duct, and an inlet 171 and an outlet 172 provided on respective ends of the circumferential duct. Furthermore, the circumferential duct may axially extend and circumferentially meander at the ends.

In this embodiment, any cooling fluid, such as air and oil, may flow through the coolant duct, other than coolant. Any place on the circumferential ducts and the joint ducts of the internal housing cylinder may be provided with at least one projection or rib that makes contact with the external housing cylinder 11.

Example 3

Figure 3:
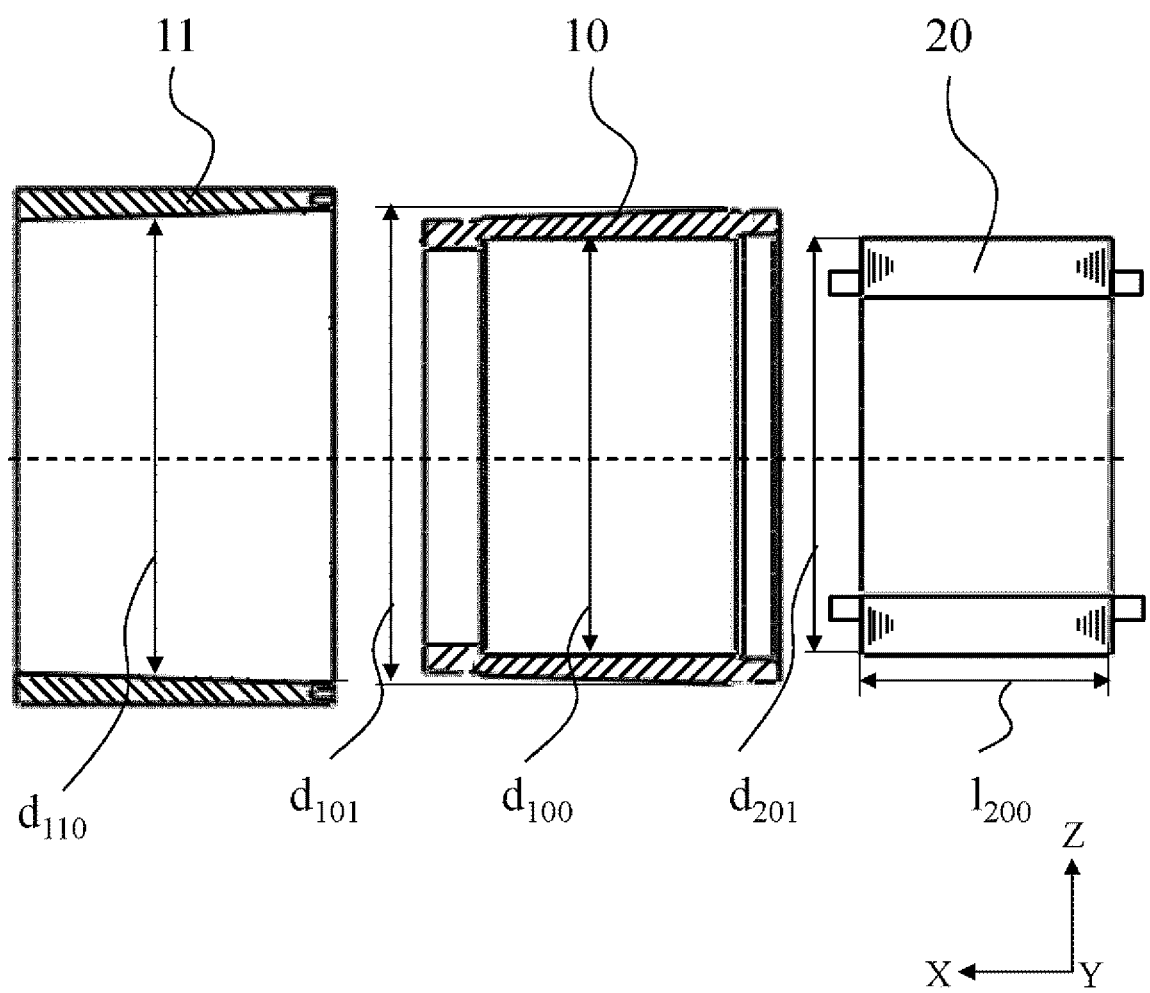
FIG. 3 is an axial sectional view of a stator and a housing before being assembled into the first embodiment.
Figure 4:
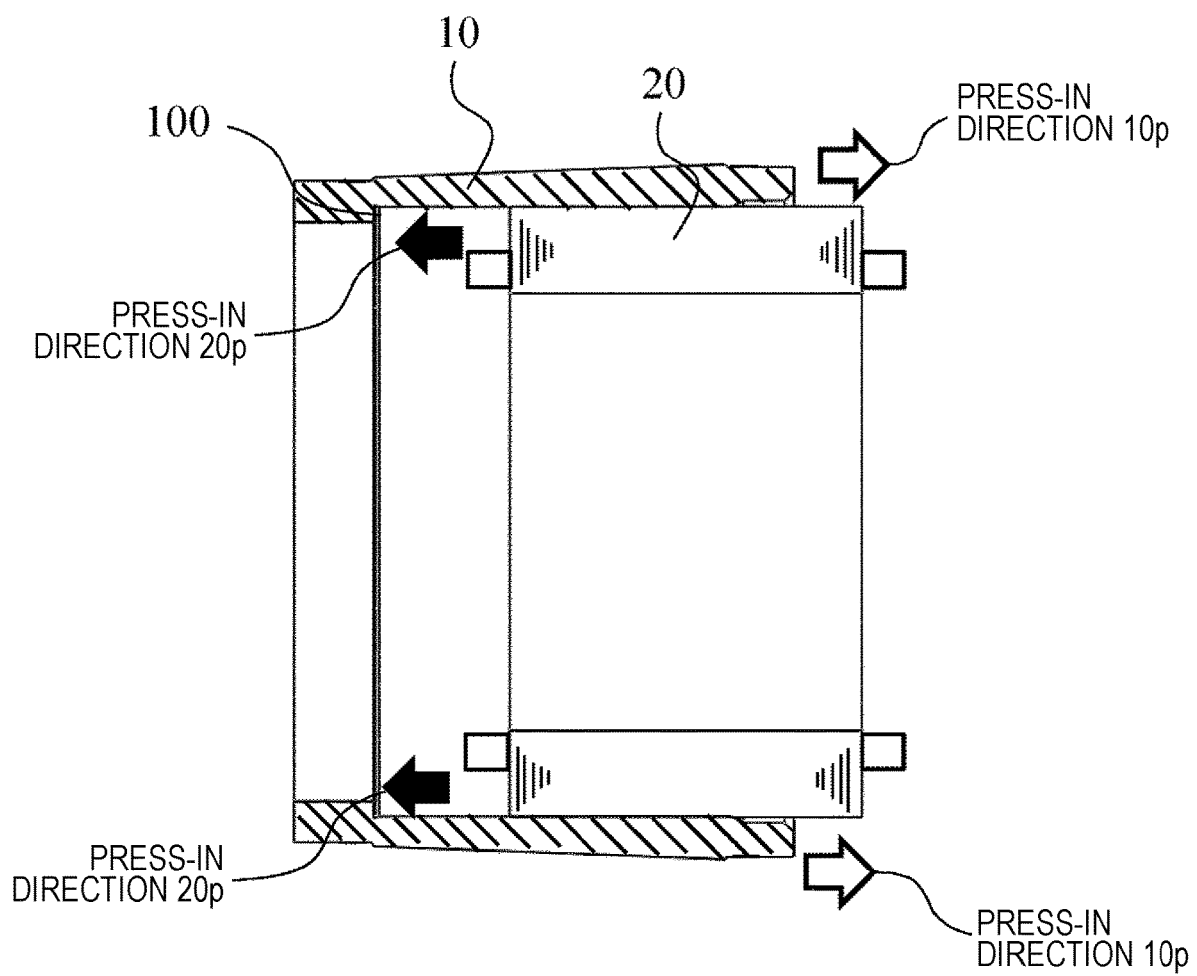
FIG. 4 is a conceptual diagram illustrating press fitting of the stator into an internal housing cylinder according to the first embodiment.
Figure 5:
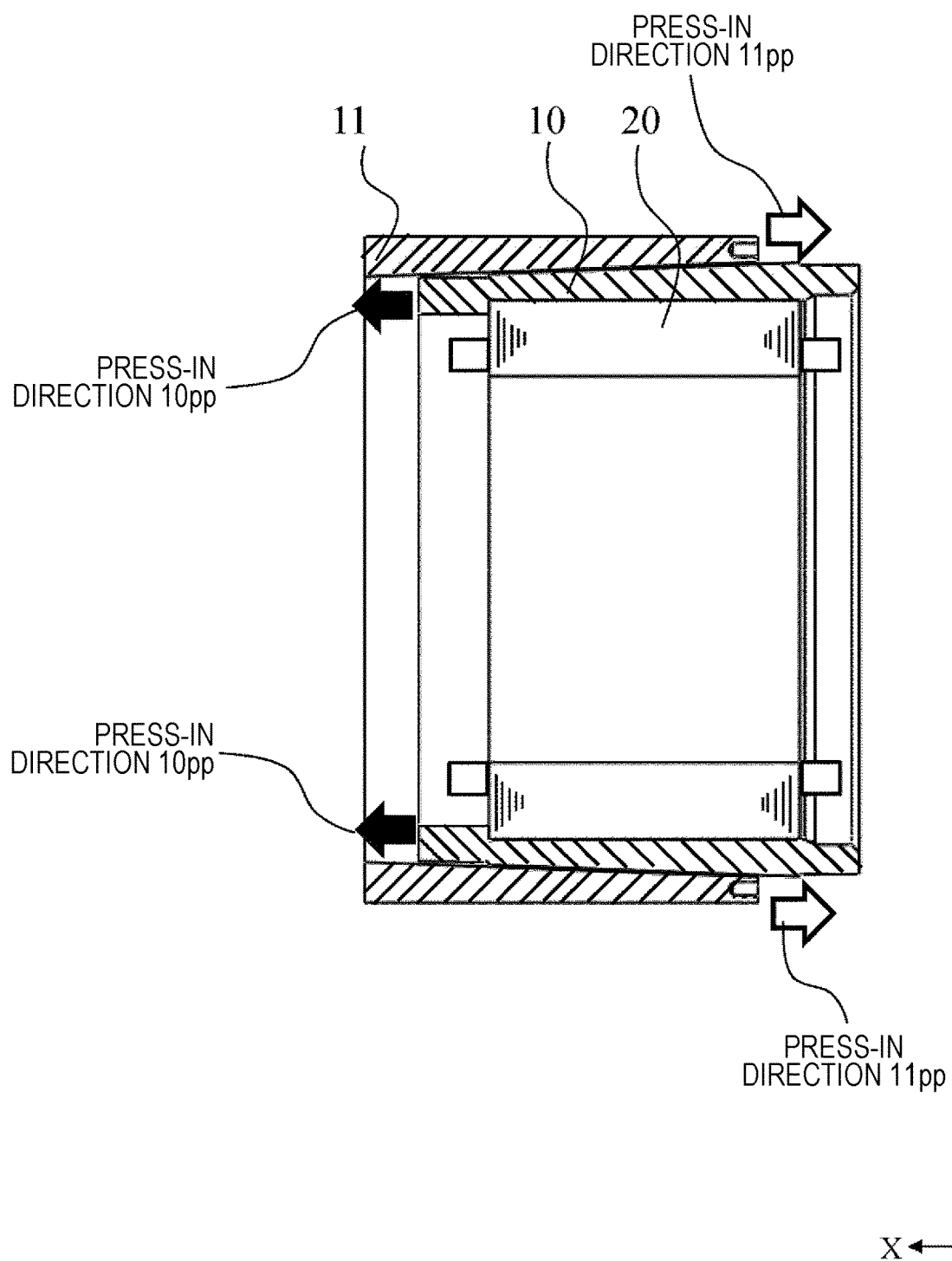
FIG. 5 is a conceptual diagram illustrating press fitting of the internal housing cylinder into an external housing cylinder according to the first embodiment.
Figure 12:
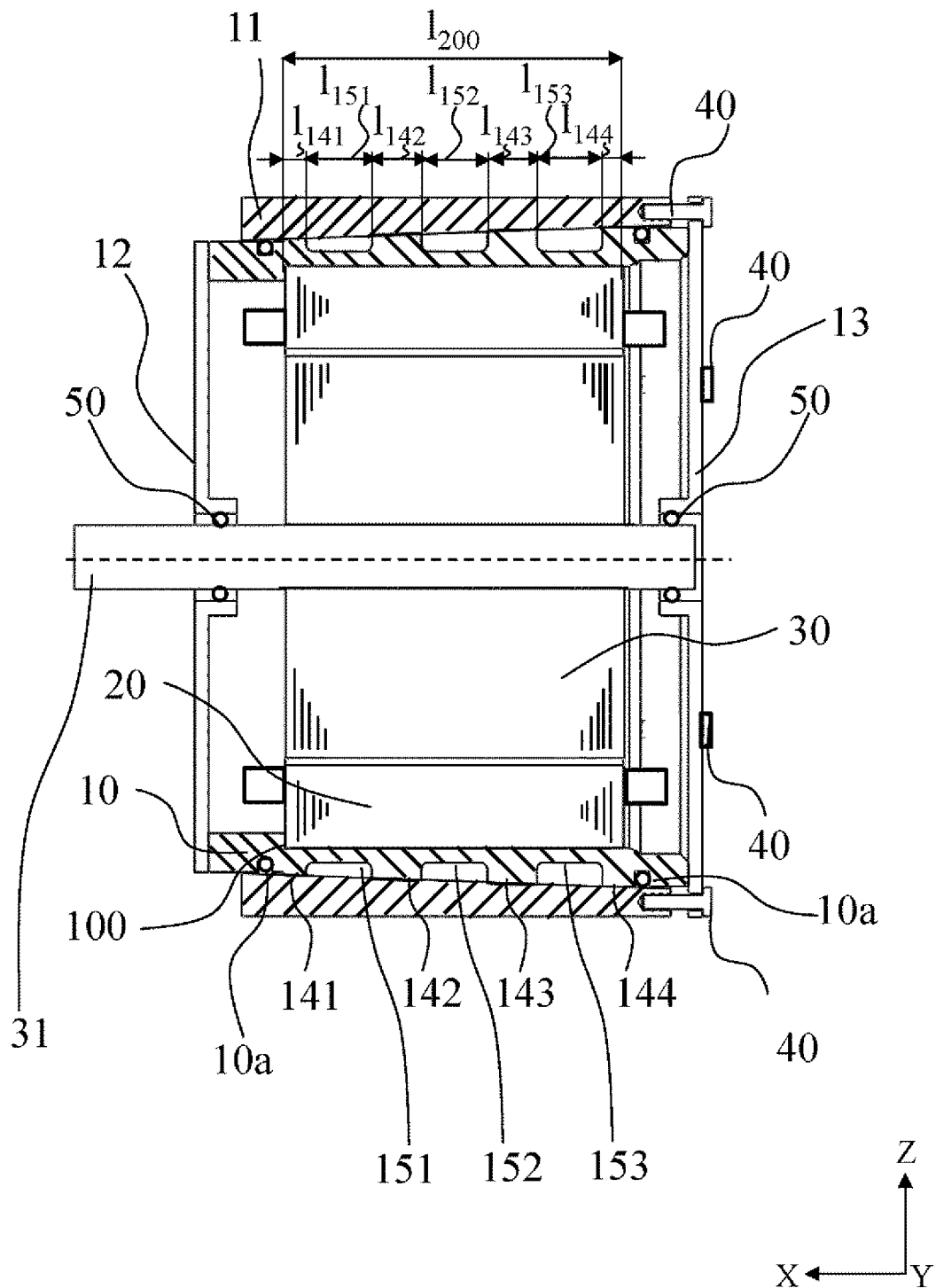
FIG. 12 is an axial sectional view of a third embodiment.

With reference to FIGS. 3 and 12, a third embodiment will now be described. As for structural elements identical to those of the first embodiment, redundant description thereof is omitted.

In this embodiment, widths $l_{142}$ and $l_{143}$ of duct walls 142 and 143 are made larger than widths $l_{141}$ and $l_{144}$ of duct walls 141 and 144. An interference of the duct walls 142 and 143 to an external housing cylinder 11 is made larger than an interference of the duct walls 141 and 144 to the external housing cylinder 11. Press fitting of the tapered duct walls 142 and 143 mostly creates a contact surface pressure required for securing a stator 20 to a housing 10. Particularly, the largest stress is put on an outer diameter site of the external housing cylinder 11 that is located circumferentially over a rear housing 13 side of the duct wall 144. The thickness of an external cylinder section on the outer perimeter of the duct walls 142 and 143 is larger than that of an external cylinder section on the outer perimeter of the duct wall 144. Circumferential stress put on the duct wall 144 can be decreased by increasing the axial widths $l_{142}$ and $l_{143}$ of the duct walls 142 and 143 so as to reduce contact surface pressure created on ends. This enables a reduction in the thickness of the external cylinder. Preferably, widths $l_{151}$, $l_{152}$, and $l_{153}$ of circumferential ducts 151, 152, and 153 should be made equal. The scope of the term "equal" referred to herein does not exclude tolerances or variation in design and manufacturing.

The width $l_{141}$ and the interference of the duct wall 141 may be made larger than the width $l_{144}$ and the interference of the 144.

The scope of the present invention should not be limited to the embodiments described above, and should include various modes. The embodiments described above are given to explain the present invention in detail, and the present invention is thus not limited to embodiments including all structural elements described above, for example. Structural elements of an embodiment may be partially replaced with structural elements of another embodiment. Some structural elements of an embodiment may be added to structural elements of another embodiment. Alternatively, some structural elements of one of the embodiments may be deleted, and/or added or replaced with structural elements of any of the other embodiments.

REFERENCE SIGNS LIST 10 internal housing cylinder
11 external housing cylinder 12 front housing
13 rear housing
20 stator
30 rotor
31 rotor shaft
40 bolt
50 bearing
100 stopper
141, 142, 143, 144 duct wall
151, 152, 153 circumferential duct
161, 162 joint duct
171 inlet
172 outlet

The invention claimed is:

1. A rotary electric machine housing comprising:
an internal cylinder allowing press fitting of a stator along an inner diameter end of the internal cylinder, the internal cylinder having an internal cylinder-side tapered face on an outer diameter end surface of the internal cylinder;
an external cylinder having an external cylinder-side tapered face on an inner diameter end of the external cylinder; and
a front plate and a rear plate on respective axial ends of the internal cylinder, wherein
an axial length of the external cylinder is equal to or greater than a total length of an axial length of the stator and a sum of a minimum value and a maximum value of machining tolerances for the internal cylinder-side tapered face of the internal cylinder and the external cylinder-side tapered face of the external cylinder,
a clearance between each axial end of the external cylinder and a corresponding external cylinder-side face of the front plate or the rear plate is 0 mm or more,
a coolant duct is formed on the outer diameter end surface of the internal cylinder,
one wall of the duct is an end duct wall that is the closest to a face including an axial end of the stator, and another wall of the duct is a center duct wall that is closer to the axial center of the stator than the end duct wall,
an axial length of the center duct wall is longer than an axial length of another end duct wall defined by the face and the end duct wall, and
a difference between an outer diameter of a section of the internal cylinder and an inner diameter of a section of the external cylinder, in which the sections are located circumferentially on the center duct wall is larger than a difference between an outer diameter of a section of the internal cylinder and an inner diameter of a section of the external cylinder, in which the sections are located circumferentially on the end duct wall.

2. The rotary electric machine housing of claim 1, wherein
an inner diameter of the internal cylinder is smaller than an outer diameter of the stator,
an outer diameter of the internal cylinder is larger than an inner diameter of the external cylinder, and
a difference between the outer diameter of the internal cylinder and the inner diameter of the external cylinder is larger than a difference between the inner diameter of the internal cylinder and the outer diameter of the stator.

3. The rotary electric machine housing of claim 1, wherein the housing is made from any of materials including aluminum, steel, copper, titanium, and plastic.

4. A rotary electric machine equipped with the housing according to claim 1.

5. The rotary electric machine housing of claim 1, wherein the internal cylinder has a tapered site only within a lamination thickness range of the stator, and the external cylinder has a tapered site extending throughout its inner diameter face.

* * * * *